United States Patent [19]

Stone

[11] Patent Number: 4,555,866
[45] Date of Patent: Dec. 3, 1985

[54] CLIMBING ANIMAL BARRIER

[76] Inventor: Emory B. Stone, P.O. Box 121, Whigham, Ga. 31797

[21] Appl. No.: 648,042

[22] Filed: Sep. 7, 1984

[51] Int. Cl.$^4$ ............................ B32B 3/02; B32B 3/28; A01G 13/10

[52] U.S. Cl. ............................................ 47/23; 428/36; 428/181; 428/182; 428/907

[58] Field of Search ................. 428/181, 36, 182, 542, 428/907; 47/23; 174/136; 49/58

[56] References Cited

U.S. PATENT DOCUMENTS

| | | | |
|---|---|---|---|
| 219,987 | 9/1879 | Scott | 47/23 |
| 1,235,520 | 7/1917 | Kirfman | 47/23 |
| 2,999,479 | 9/1961 | Carder | 47/23 |

Primary Examiner—Paul J. Thibodeau
Attorney, Agent, or Firm—B. P. Fishburne, Jr.

[57] ABSTRACT

A climbing animal barrier for tree trunks, poles, fences and walls is disclosed. A barrier wall consisting of accordion-pleated metal cloth is bounded on its exterior by a solid metal skirt element which the climbing animal cannot grip or penetrate with its claws and thus is effectively prevented from circumventing the barrier. When applied to a tree trunk, the barrier can expand automatically with tree growth. Serious loss of nut crops and the like is prevented.

12 Claims, 13 Drawing Figures

CLIMBING ANIMAL BARRIER

BACKGROUND OF THE INVENTION

The present invention has for its principal objective to satisfy an existing need for a low cost effective and convenient climbing animal barrier which is readily mountable on diverse structures.

A further and more specific object of the invention is to provide an effective climbing animal barrier for mounting on the trunks of nut trees and the like to prevent expensive losses of crops which are presently experienced due to the unavailability of any practical, economical and conveniently used barrier means.

Another object of the invention is to provide a barrier of the above-mentioned type whose wall in the direct climbing path of the animal is formed of accordion-pleated metal cloth which attracts the animal because the animal can see through it, and defeats all efforts by the animal to penetrate the barrier.

Another object of the invention is to provide a climbing animal barrier for tree trunks which has the ability to expand or "grow" as the tree trunk grows.

Still another object of the invention is to provide a climbing animal barrier having a body portion of foraminous material through which the climbing animal can see and an attached marginal portion of unperforated slick material which cannot be gripped or penetrated by the animal's claws.

Another object of the invention is to provide a barrier of the above-mentioned type constructed entirely from very inexpensive available materials and being easy to install by unskilled labor on diverse structures.

Other features and advantages of the invention will become apparent to those skilled in the art during the course of the following detailed description.

DETAILED DESCRIPTION

Figure 1:
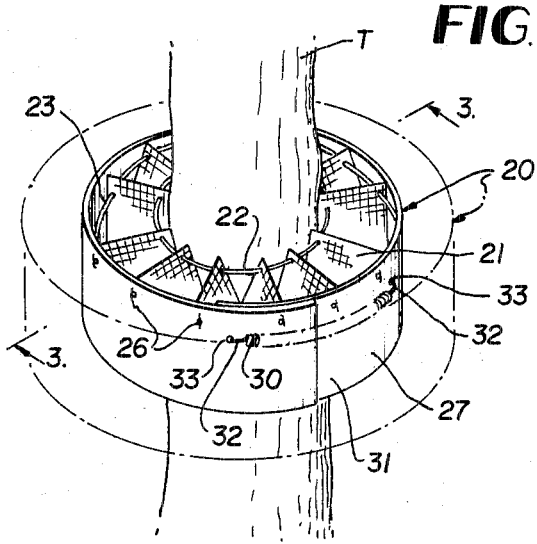
FIG. 1 is a perspective view of a climbing animal barrier for tree trunks according to one preferred embodiment of the invention.
Figure 2:
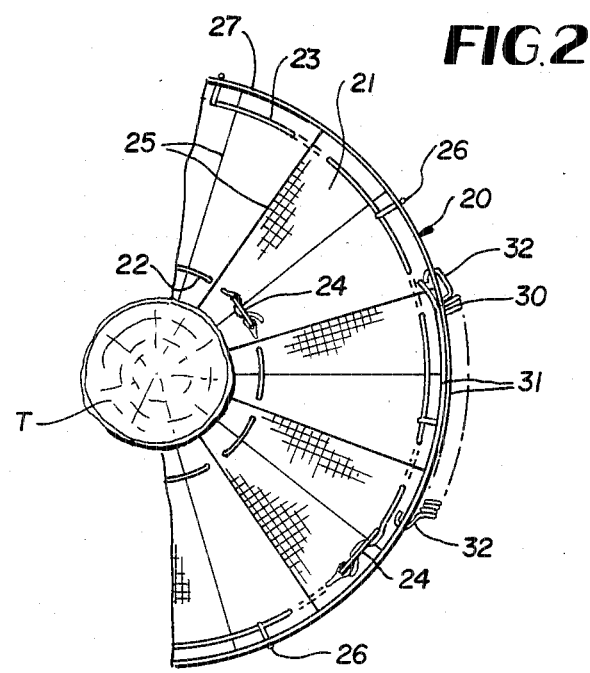
FIG. 2 is a fragmentary plan view of the invention in FIG. 1.
Figure 3:
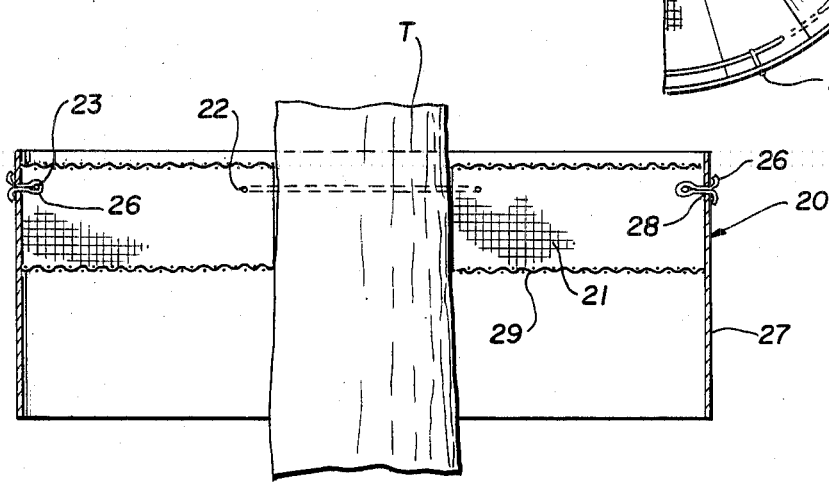
FIG. 3 is an enlarged vertical section taken on line 3—3 of FIG. 1.

Referring to the drawings in detail wherein like numerals designate like parts, a climbing animal barrier according to one preferred embodiment of the invention is designated in its entirety by the numeral 20, FIGS. 1–3. The barrier 20 comprises an accordion-pleated relatively stiff metal cloth barrier wall 21, such as ¼ inch mesh metal cloth. This metal cloth is a standard hardware item which can be purchased in roll form and cut into strips of the desired width for producing the climbing animal barrier, the strips being zigzag folded into the accordion-pleated formation shown in the drawings.

When the barrier is applied to a tree trunk T, the metal cloth barrier wall 21, after being cut to proper length to extend around the circumference of the tree trunk, is installed at the desired elevation on the trunk. An inside cable 22 is laced through apertures of the metal cloth strip near one longitudinal edge thereof. An outer cable 23 is similarly laced through apertures of the metal cloth strip near its other longitudinal edge. The ends of the cables 22 and 23 are loose and unconnected at this time. The metal cloth barrier wall 21 can then be hung on a temporary nail, not shown, driven into the tree trunk at the proper elevation, this nail being removed when the barrier is completely installed. If desired, a pair of plastic hanging loops, not shown, can be provided at the opposite ends of the metal cloth strip to facilitate hanging the barrier wall on the tree trunk.

Figure 4:
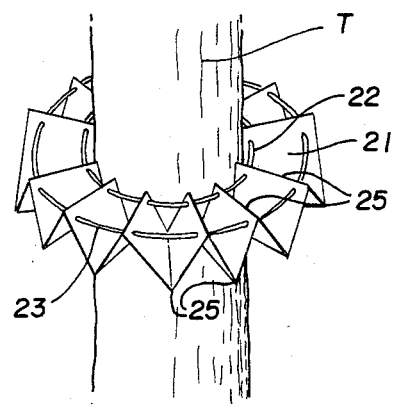
FIG. 4 is a perspective view illustrating a step in the procedure for mounting the barrier on a tree trunk or pole.

The barrier wall 21 need only be hung from the temporary nail when the tree trunk is of such a size that the installer's arms cannot reach around the trunk. In any case, as depicted in FIG. 4, the metal cloth barrier wall is wrapped around the tree trunk and the inside cable 22 is tightened and its ends are connected by a slip fastener 24 or other appropriate means. The inner cable 22, when pulled snug, causes the inner edge of the metal cloth barrier wall 21 to contact and conform to the circumferential surface of the tree trunk and the accordion fold or pleats 25 assume radial positions relative to the tree trunk. The outer cable 23 can now be similarly tightened with its overlapping ends anchored by another slip fastener 24, as shown in FIG. 2. The slip fasteners 24 allow the ends of the cables 22 and 23 to adjust themselves automatically as the tree trunk enlarges during growth. The interior edge of the barrier wall 21, while contacting the tree trunk, does not slide on the tree trunk as growth occurs, but the points of contact with the tree trunk remain fixed, and enlargement of the barrier wall 21 takes place by gradual unfolding of the pleated structure.

Wire clips 26 are now applied to the outer cable 23 at a plurality of circumferentially spaced points around the barrier. A preferably galvanized solid metal strip or skirt 27 having overlapping ends, FIG. 2, is placed around the exterior edge of the pleated metal cloth barrier wall 21 and is attached to the latter by means of the wire clips 26, as shown in FIG. 3. The metal strip or skirt 27 has a series of spaced apertures 28 near and below its top edge to receive the clips 26. Through these clips and the outer cable 23, the skirt which is vertically disposed is attached to the metal cloth pleated barrier wall 21 which extends horizontally in the structure. The deep pleating of the barrier wall 21 lends rigidity and support to the structure and the engagement of the inner edge of the barrier wall 21 with the tree trunk, FIG. 3, provides a stable cantilever support for the same. The unperforated skirt is attached near its top edge to the metal cloth barrier wall and extends substantially below the lower folded edges 29 of the barrier wall, FIG. 3, to produce an annular space below the barrier wall within which the climbing animal becomes more-or-less enclosed as it attempts to climb the tree trunk and penetrate the metal cloth barrier wall 21.

In this connection, the animal will always try to penetrate the metal cloth wall first, simply because it can see through it. When the animal is adjacent to the metal cloth barrier wall 21, the overhanging skirt 27 makes the animal feel caged out. Should the animal attempt to circumvent the skirt 27, it could not, because its claws could not penetrate the skirt for support. It would be impossible for the animal on the tree trunk to jump around the barrier in order to gain access to the upper part of the tree.

Following attachment of the skirt 27 to the barrier wall 21 through the clips 26 and outer cable 23, a retractile coil spring 30 is placed adjacent to the overlapping end portions 31 of the skirt, FIG. 2, on the outside of the skirt, and end hooks 32 of this spring are engaged within a pair of apertures 33 provided in the metal skirt to bias the end portions 31 into overlapping relationship. As the tree trunk enlarges, the connection formed by the spring 30 can yield to allow the skirt 27 to expand circumferentially. The pleated metal cloth wall 21 will correspondingly unfold, as previously explained, and the animal barrier structure in essence can grow with the tree trunk while maintaining its effectiveness. Such growth is shown schematically in phantom lines in FIG. 1.

Figure 5:
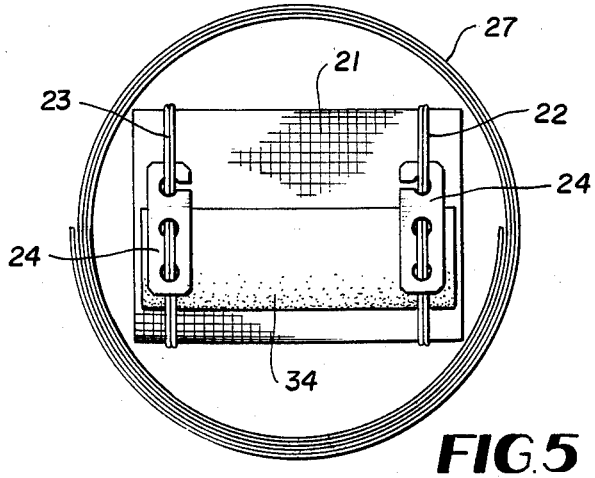
FIG. 5 is a plan view of the barrier in a packaged state.

FIG. 5 shows the described climbing animal barrier 20 in its compact packaged state. The accordion-pleated metal cloth strip is compressed and placed inside of the solid metal strip 27 which is coiled snugly around the strip 21. The collapsed strip 21 is embraced and held by the two cables 22 and 23, attached to the slip fasteners 24. A plastic envelope 34 or the like can be provided for the clips 26 or other small hardware.

The invention as described is not limited to the use of the clips 26 and slip fasteners 24. Other convenient hardware can be substituted for these elements. The essential components of the invention as thus far described are the accordion-pleated wire cloth wall 21, the unperforated skirt 27 and the two cables 22 and 23.

Figure 6:
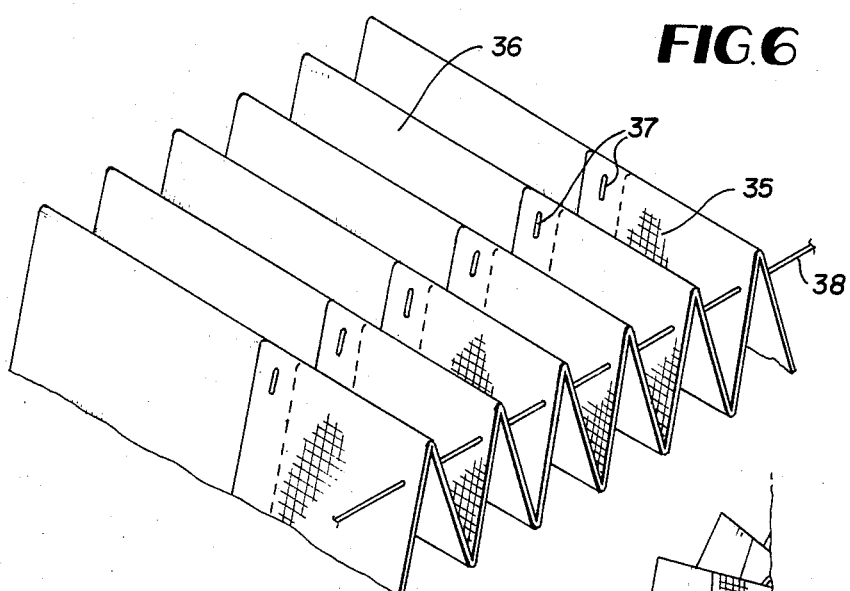
FIG. 6 is a fragmentary perspective view showing a modified form of climbing animal barrier.
Figure 7:
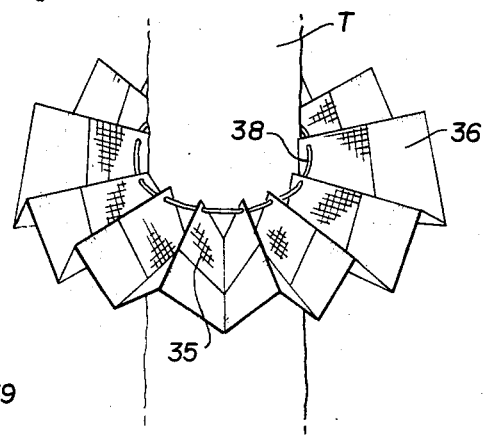
FIG. 7 is a perspective view of the barrier in FIG. 6 applied to a tree trunk.

Another embodiment of the invention is shown in Figures 6 and 7 wherein an accordion-pleated metal cloth strip 35 of appropriate length is attached near one longitudinal edge in overlapping relationship to an unperforated accordion-pleated solid metal strip 36 of equal length. The unperforated strip 36 can be somewhat wider than the metal cloth strip 35. Appropriate fasteners 37, such as staples, are employed to join the two strips 35 and 36. A single cable 38 is laced through openings of the wire cloth strip 35 and the assembly is placed around the tree trunk T, FIG. 7, in substantially the manner described for the mounting of the barrier wall 21 on the tree trunk in FIG. 4, except that there is no outside cable required. The entire accordion-pleated barrier structure consisting of the two strips 35 and 36 projects horizontally radially from the trunk T and completely surrounds the same. In both forms of the invention, FIGS. 1 and 7, the meeting and preferably overlapping ends of the wire cloth are laced together with wire or cable after being placed around the tree trunk, such lacing wire being omitted from the drawing for the sake of simplicity.

As shown in FIG. 7, after application to the tree trunk, the connected pleated strips 35 and 36 occupy the same planes. The inner longitudinal edge of the structure abuts the circumference of the tree trunk, as shown and described in FIG. 3.

Figure 8:
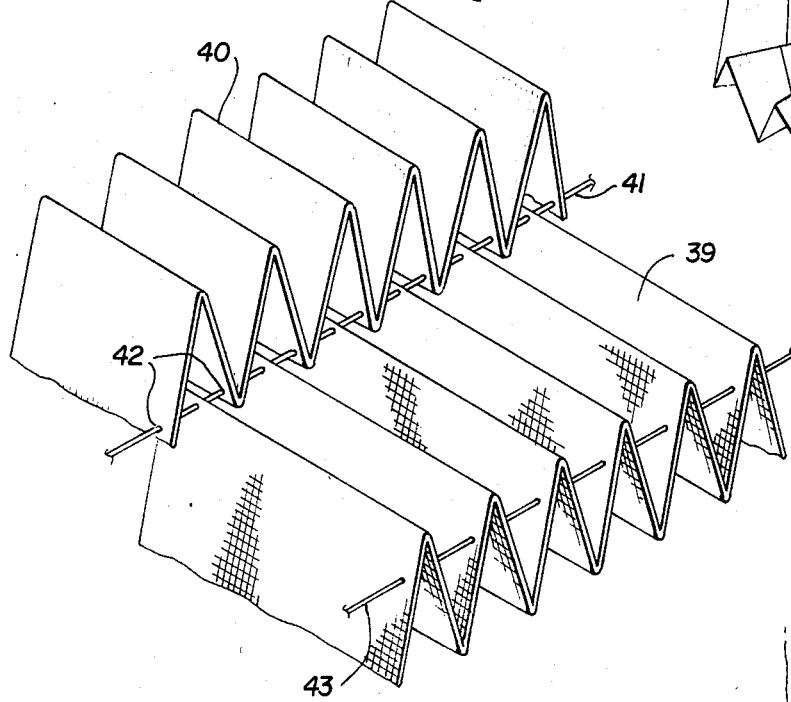
FIG. 8 is a fragmentary perspective view of another modified form of barrier according to the invention.
Figure 9:
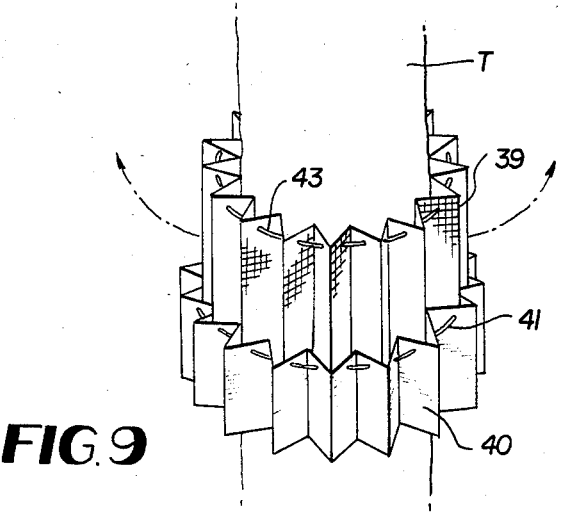
FIG. 9 is a perspective view showing a step in the procedure of mounting the barrier in FIG. 8 on a tree trunk.
Figure 10:
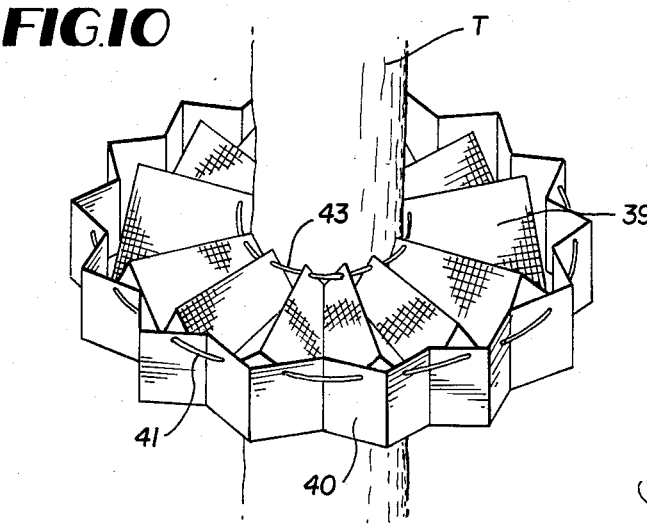
FIG. 10 is a perspective view of the barrier in FIG. 8 completely installed on a tree trunk.
Figure 13:
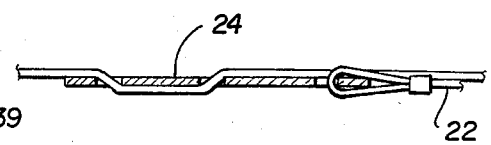
FIG. 13 is a fragmentary vertical section taken through a slip fastener and showing an associated cable connected thereto in accordance with the invention.

FIGS. 8 through 10 show another embodiment of the invention in which an accordion-pleated metal cloth strip 39 of appropriate length is connected to a separately formed accordion-pleated solid metal strip 40 by a cable 41 passed through openings 42 of the strip 40 near one edge thereof and through adjacent mesh openings of the strip 39. The cable 41 is located close to the peaks and valleys of the two strips 39 and 40 and forms a pivotal connection therebetween. A second cable 43 is passed through mesh openings of the wire cloth strip 39 near its other longitudinal edge.

As shown in FIG. 9, the barrier structure in FIG. 8 can first surround a tree trunk or pole circumferentially while the strips 39 and 40 are in parallel circumferential planes. As depicted in FIG. 10, the wire cloth pleated strip 39 is swung upwardly to extend horizontally radially from the trunk T before the inner cable 43 is pulled tight. This holds the inner edge of the strip 39 squarely against the tree trunk, as described in connection with FIG. 3. The solid metal strip 40 is swung downwardly to a vertical position below the outer cable 41 and the latter can be tightened by use of one of the slip fasteners 24, not shown in FIG. 10. This provides a barrier similar to the barrier 20 except that the annular skirt 27 is replaced by the pleated star-like vertical skirt 40. The same functional and cost advantages of the invention are present in all of the embodiments thus far described.

Figure 11:
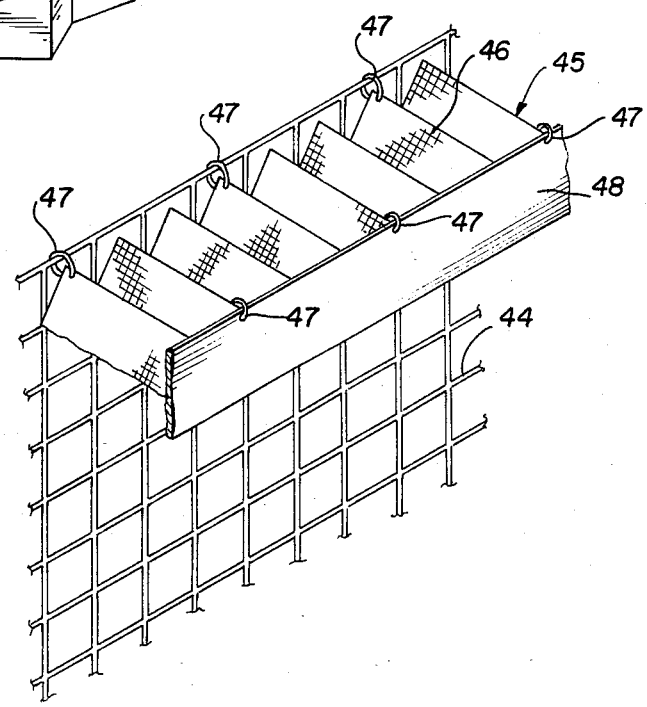
FIG. 11 is a fragmentary perspective view of a climbing animal barrier according to the invention installed upon a fence.

FIG. 11 illustrates the invention in the form of a barrier applied to the top of a fence 44. The barrier shown at 45 projects horizontally outwardly from the top of the fence to bar a climbing animal, such as a squirrel, from getting over the fence. The barrier consists of a horizontal accordion-pleated metal cloth strip 46 of uniform width and any necessary length. Rings or clips 47 are utilized at spaced points to attach the inner edge of the strip 46 to the top of the fence such that the inner edge of the barrier strip 46 squarely abuts the fence and is stabilized thereby to hold the barrier horizontally. An unperforated metal strip 48 forms a vertical skirt along the full length of the barrier having its top edge attached by rings or clips 47 to the metal cloth strip 46. The skirt 48 projects well below the barrier wall 46 to form a linear climbing animal-resistant structure much like the annular structure in FIG. 3.

Figure 12:
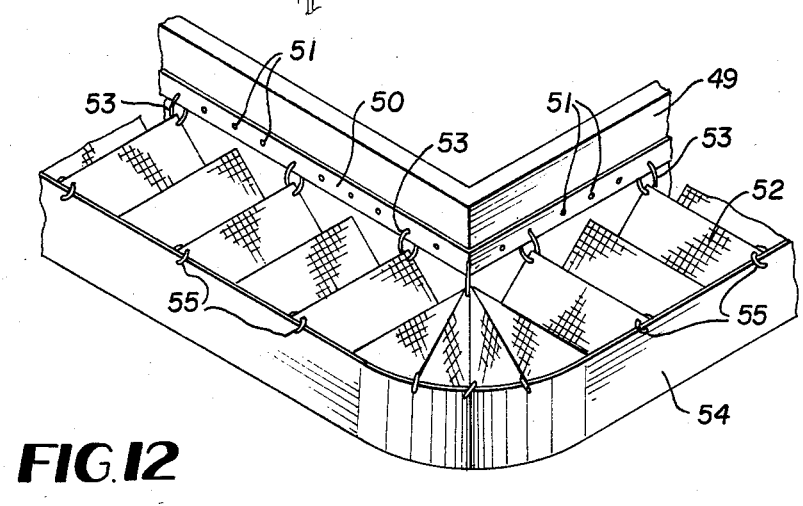
FIG. 12 is a fragmentary perspective view of a barrier according to the invention installed at a corner of a wall structure.

FIG. 12 depicts a barrier similar to that shown in FIG. 11 attached to a corner of a wall 49 through a suitable mounting strip 50 on the wall having apertures 51. A metal cloth barrier strip 52 is attached to the strip 50 by spaced rings 53 or the like so that the barrier wall 52 extends horizontally outwardly from the wall with its inner edge squarely contacting the wall in the manner of a cantilever. A depending outer skirt 54 of unperforated metal is hung vertically from the outer edge of the wire cloth pleated barrier wall 52 by additional rings 55. The structure forms the same impediment to a climbing animal as the previously-described barrier structures.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A metal barrier to block climbing animals comprising an accordion pleated generally horizontal foraminous barrier wall, flexible means to attach the inner longitudinal margin of the foraminous barrier wall in abutment with a substantially vertical support surface on which the metal barrier is installed, a substantially imperforate barrier sheet adjacent to the outer longitudinal margin of the foraminous barrier wall and being substantially coextensive lengthwise therewith, means connecting the foraminous barrier wall and said imperforate barrier sheet in assembled relationship, and means on the metal barrier allowing expansion thereof, at least said foraminous barrier wall extending substantially horizontally away from said support surface on which the barrier is installed.

2. A metal barrier to block climbing animals as defined in claim 1, wherein the foraminous accordion pleated barrier wall is substantially annular and includes peaks and valleys which radiate from said vertical support surface on which the barrier is installed.

3. A metal barrier to block climbing animals as defined in claim 2, and said substantially imperforate barrier sheet being substantially annular and depending as a skirt from the outer longitudinal margin of said accordion pleated foraminous barrier wall.

4. A metal barrier to block climbing animals as defined in claim 2, and said flexible means including a flexible cable laced through apertures of the foraminous barrier wall near and substantially parallel to said inner longitudinal margin and said vertical support surface.

5. A metal barrier to block climbing animals as defined in claim 1, and said means connecting the foraminous barrier wall and said imperforate barrier sheet including a cable laced through apertures of the foraminous barrier wall near and substantially parallel to its outer longitudinal margin and being connected to said substantially imperforate barrier sheet.

6. A metal barrier to block climbing animals as defined in claim 5, and spaced clip elements forming the connection between the last-named cable and the substantially imperforate barrier sheet, the barrier sheet having spaced apertures receiving the clip elements.

7. A metal barrier to block climbing animals as defined in claim 1, and said accordion pleated foraminous barrier wall being at least in part linear and the accordion pleats thereof having peaks and valleys which are parallel and substantially equidistantly spaced and extending transversely across the width of the foraminous barrier wall, and said substantially imperforate barrier sheet defining a depending substantially vertical skirt attached to the foraminous barrier wall along the outer longitudinal margin thereof.

8. A metal barrier to block climbing animals as defined in claim 2, and said substantially imperforate barrier sheet comprising an accordion pleated sheet element attached to the foraminous barrier wall along the outer longitudinal margin thereof and being substantially coextensive circumferentially with said barrier wall.

9. A metal barrier to block climbing animals as defined in claim 8, and the accordion pleated sheet element lying in coplanar relationship with the accordion pleated foraminous barrier wall and forming a contiguous extension thereof.

10. A metal barrier to block climbing animals as defined in claim 8, and the accordion pleated sheet element being substantially perpendicular to and projecting downwardly from the accordion pleated foraminous barrier wall.

11. A metal barrier to block climbing animals comprising a pair of somewhat flexible accordion pleated barrier elements one of which is foraminous and the other being substantially imperforate, flexible means attaching one of the barrier elements to a substantially vertical support surface, means pivotally connecting one of the barrier elements to the other near and along one longitudinal edge of each barrier element, and the somewhat flexible accordion pleated barrier elements being somewhat expansible lengthwise and being substantially coextensive lengthwise, whereby the two barrier elements may be arranged substantially in perpendicular relationship when the metal barrier is placed around a substantially vertical and generally circular cross section support member.

12. A metal barrier to block climbing animals comprising first and second contiguous longitudinally coextensive accordion pleated barrier elements one of which is foraminous and the other of which is substantially imperforate, flexible means to attach the metal barrier around a standing tree trunk with the substantially imperforate barrier element arranged radially outermost and the foraminous barrier element arranged innermost with both barrier elements extending substantially horizontally, means connecting said barrier elements one to the other along adjacent longitudinal marginal portions of the barrier elements, and means allowing circumferential expansion of the metal barrier in response to gradual enlargement of a tree trunk on which the metal barrier is installed.

* * * * *